United States Patent
Mons

(10) Patent No.: US 8,561,386 B2
(45) Date of Patent: Oct. 22, 2013

(54) WALL COOLING DEVICE

(75) Inventor: Claude Marcel Mons, Savigny le Temple (FR)

(73) Assignee: SNECMA, Paris (FR)

( * ) Notice: Subject to any disclaimer, the term of this patent is extended or adjusted under 35 U.S.C. 154(b) by 454 days.

(21) Appl. No.: 12/988,398

(22) PCT Filed: Apr. 15, 2009

(86) PCT No.: PCT/FR2009/050688
§ 371 (c)(1),
(2), (4) Date: Oct. 18, 2010

(87) PCT Pub. No.: WO2009/138613
PCT Pub. Date: Nov. 19, 2009

(65) Prior Publication Data
US 2011/0030337 A1    Feb. 10, 2011

(30) Foreign Application Priority Data

Apr. 17, 2008   (FR) ...................................... 08 52609

(51) Int. Cl.
*F02K 99/00*      (2009.01)

(52) U.S. Cl.
USPC .......................................................... 60/266

(58) Field of Classification Search
USPC ........................................ 60/226.1, 782, 785
See application file for complete search history.

(56) References Cited

U.S. PATENT DOCUMENTS

| | | | | |
|---|---|---|---|---|
| 4,752,182 A * | 6/1988 | Zaehring et al. | ................ | 415/12 |
| 4,807,433 A * | 2/1989 | Maclin et al. | ................ | 60/795 |
| 5,171,024 A * | 12/1992 | Janocko | ................ | 277/644 |
| 7,340,883 B2 * | 3/2008 | Wood et al. | ................ | 60/226.1 |
| 8,161,754 B2 * | 4/2012 | Sheaf et al. | ................ | 60/771 |
| 2005/0199845 A1 * | 9/2005 | Jones et al. | ................ | 251/129.06 |
| 2007/0154305 A1 * | 7/2007 | Arness et al. | ................ | 415/209.2 |
| 2008/0016871 A1 | 1/2008 | Lavin et al. | | |
| 2008/0044280 A1 | 2/2008 | Le Docte et al. | | |
| 2009/0133406 A1 * | 5/2009 | Dijoud et al. | ................ | 60/771 |

FOREIGN PATENT DOCUMENTS

| | | |
|---|---|---|
| DE | 199 19 835 | 11/2000 |
| EP | 1 882 822 | 1/2008 |
| FR | 2 873 167 | 1/2006 |
| JP | 60 164192 | 8/1985 |
| JP | 61-186785 | 8/1986 |

OTHER PUBLICATIONS

International Search Report issued Sep. 30, 2009 in PCT/FR09/050688 filed Apr. 15, 2009.

* cited by examiner

*Primary Examiner* — Phutthiwat Wongwian
(74) *Attorney, Agent, or Firm* — Oblon, Spivak, McClelland, Maier & Neustadt, L.L.P.

(57) ABSTRACT

A wall-cooling device for cooling a wall subjected to a heat source and to an outer fluid. The device includes a cooling part with a fastening portion and a cooling portion. The cooling part is made of a thermally-conductive shape-memory alloy having a transition temperature T. The fastener portion is for fastening the device rigidly on a face of the wall. The cooling portion is shaped so that it takes up a first position that is substantially parallel to the wall when the temperature of the wall is lower than the temperature T and so that it takes up a second position in which a plane of the second portion defines, relative to a plane tangential to the wall, a dihedral angle lying in the range 45° to 90°.

14 Claims, 5 Drawing Sheets

WALL COOLING DEVICE

The present invention relates to a device for cooling a wall and more particularly a wall having a first face subjected to a heat source and a second face along which an outer fluid flows at a temperature that is lower than the temperature at which it is desired to maintain the wall, and it also relates to a turbine engine equipped with such a cooling device.

The problem of cooling a wall naturally presents itself in very many technical fields. This applies in particular to turbojets in which certain walls may reach unacceptable temperatures and for which it is thus necessary to provide a cooling system.

Still more particularly, the invention relates to a wall-cooling device that produces a cooling effect only intermittently, i.e. when the wall actually reaches its critical temperature.

For aircraft turbojets, the cooling of such walls or skins is currently usually performed by means of rows of perforated pipes or tubes that are capable of cooling the wall when they are supplied with cooling fluid.

A drawback of that cooling system is that it requires particular structures to be put into place together with a system for supplying cooling fluid to said structure.

A first object of the present invention is to provide a wall-cooling device that is of simpler structure and that automatically produces the cooling effect only when the wall to be cooled reaches the temperature at which it is desired to maintain said wall.

According to the invention, to achieve this object, the wall-cooling device for cooling a wall having a first face subjected to a heat source and a second face along which an outer fluid flows at a temperature that is less than T in order to maintain said wall at a temperature that is substantially equal to the temperature T, is characterized in that it comprises at least one cooling part including a fastening portion and a cooling portion, said part being made of a thermally-conductive shape-memory alloy having a transition temperature T, said fastener portion including fastener means for fastening it rigidly on the second face of said wall, said cooling portion being shaped so that it takes up a first position that is substantially parallel to said wall when the temperature of the wall is lower than said temperature T and, if the temperature of the wall is at least equal to T, so that it takes up a second position in which the mean plane of said second portion defines, relative to a plane tangential to said wall, a dihedral angle lying in the range 45° to 90°.

By using cooling parts made of a thermally-conductive shape-memory alloy, the cooling effect is produced only when the temperature of the wall to be cooled actually reaches the transition temperature of the thermally-conductive shape-memory alloy as a result of the thermal conduction between the wall and the cooling part. So long as that temperature is not reached, the cooling portion of the cooling part is pressed against the wall and therefore produces no particular cooling effect. In contrast, when said temperature is reached, the cooling part passes into its second state and the cooling portion takes on an angle lying in the range 45° to 90° relative to the wall to be cooled.

It is known that various shape-memory alloys exist that correspond to various transition temperatures. It is also known that it is possible, in a preliminary training or pre-forming stage, to subject the part made of shape-memory material to conditioning that enables said part, once its transition temperature is reached, to take on a modified shape that is fully defined in advance after said part has been forced a certain number of times. It is also known that said part can change shape a very large number of times, e.g. fifty thousand times.

It is also known that, the temperature at which the shape-memory alloy part resumes its initial shape is usually offset by approximately twenty degrees relative to its transition temperature. Thus, a flapping phenomenon is avoided while regulating the temperature of the wall.

In a first embodiment, the mean plane of the cooling portion is substantially parallel to the flow direction of the outer fluid.

In this event when the cooling portion is in its second position, said portion plays the role of cooling fin that increases the heat-exchange area between the wall and the outer fluid.

In a second embodiment, the mean plane of the cooling portion of the cooling part is substantially orthogonal to the flow direction of the outer fluid.

It should be understood that in the second embodiment, the cooling portions in the active position, give rise to turbulence in the outer stream in immediate proximity with the wall to be cooled, thus increasing the Reynolds coefficient of said flow and thus improving the cooling effect.

Also preferably, and whatever the embodiment envisaged, the cooling device includes a plurality of cooling parts substantially in alignment along at least one straight line perpendicular to the flow direction of the outer stream.

In another embodiment, the wall to be cooled is substantially a surface of revolution and the cooling device comprises a plurality of cooling parts placed substantially along at least one circle of the surface of revolution.

In yet another embodiment, the cooling parts have different transition temperatures.

By means of this arrangement, it is possible to adapt the cooling effect produced by the device as a function of a temperature gradient that may exist as a result of the nature of the heat source facing the first face of the wall to be cooled.

A second object of the present invention is to supply an aircraft turbine engine that is equipped with a cooling device of the above-mentioned type.

Other characteristics and advantages of the invention appear better on reading the following description below of several embodiments of the invention given by way of non-limiting example. The description makes reference to the accompanying figures, in which.

Figure 1A:
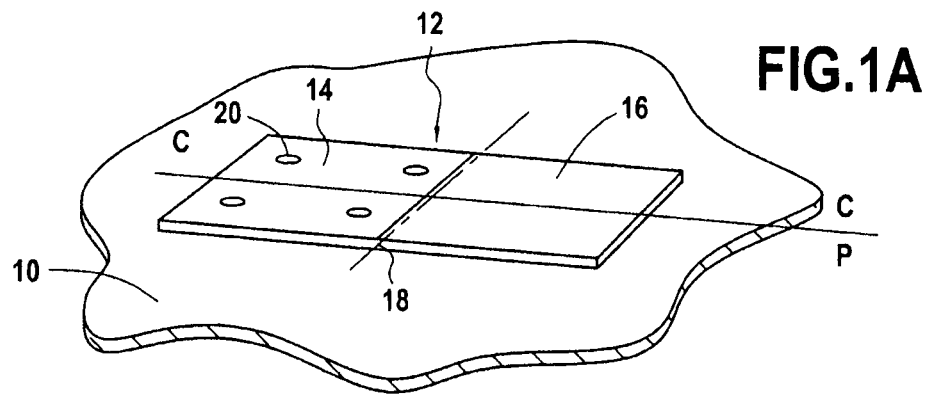
FIGS. 1A, 1B and 1C show the principle of the invention, FIG. 1A showing in perspective the cooling part at rest, FIG. 1B showing the cooling part in its active position, and FIG. 1C showing a section along the line C-C shown in FIG. 1A.

In reference firstly to FIGS. 1A, 1B and 1C, the principal of the invention is described below on the basis of one cooling part. In the figures, a wall 10 is shown presenting an inside face 10a facing a heat source 11 and an outside face 10b along which there flows a cooling fluid represented by arrow F. The problem to be solved is that of maintaining the wall 10 at a temperature that is substantially equal to T, it being understood that the fluid stream F is itself at a temperature that is lower than T. The individual cooling part 12 is constituted by a first portion 14 for fastening and by a second portion 16 for cooling. Said two portions are connected by a fold zone 18.

The entire cooling part 12 is made from a shape-memory material with a transition temperature that is matched to the temperature at which it is preferred to maintain the wall 10. Shape-memory alloys are well known and it is therefore not necessary to describe them here in greater detail. Shape-memory alloys such as copper-aluminum-beryllium or even copper-aluminum-nickel are well known. For shape-memory alloys having a higher transition temperature, mention can be made of the rhenium-palladium alloy that has a transition temperature of around 1050° C.

Figure 1B:
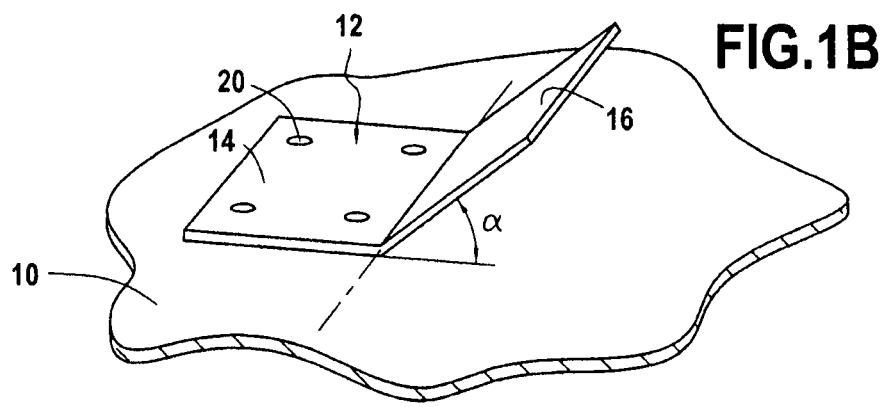
Figure 1C:
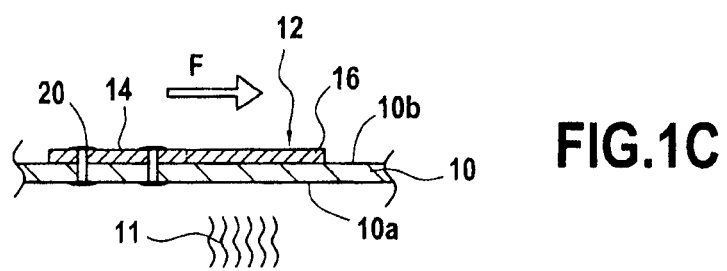

As known, in an initial stage, the part 12 made of a shape-memory alloy is pre-formed or trained in such a manner that, at its transition temperature, it spontaneously takes on the shape shown in FIG. 1B. In other words, the cooling portion 16 of the cooling part 12 in this active position forms an angle α relative to the plane of the wall 10. Said angle preferably lies in the range 45° to 90°. The fastener portion 14 can be secured to the wall 10 by any suitable means such as by riveting 20 or also by welding.

Operating said cooling part is simple. When the temperature of the wall 10 is lower than the desired temperature T, the cooling portion 16 is in alignment with the fastener portion 14, i.e. substantially pressed against the wall 10. The cooling part is therefore inactive. In contrast when the temperature of the wall 10 rises, by thermal conduction, the temperature of the cooling part 12 rises in the same manner and when it reaches the transition temperature T, it takes on the shape shown in FIG. 1B, causing the cooling portion 16 to be active since said portion is then at the angle α with the wall 10. The angle α preferably lies in the range 45° to 90°.

It goes without saying that, when the wall 10 returns to a temperature that is lower than T, the cooling part and more particularly its cooling portion 16 returns to its initial position.

More precisely, it should be pointed out that, between the transition temperature T and the temperature at which the shape-memory alloy part returns to its initial shape, there exists a temperature range that is usually about 20° C. This temperature difference makes it possible for the system to operate in stable manner and also makes it possible to avoid flapping phenomena.

It is important to emphasize that the cooling part does not require any additional mechanical system in order to pass from its inactive state to its active state.

Figure 2:
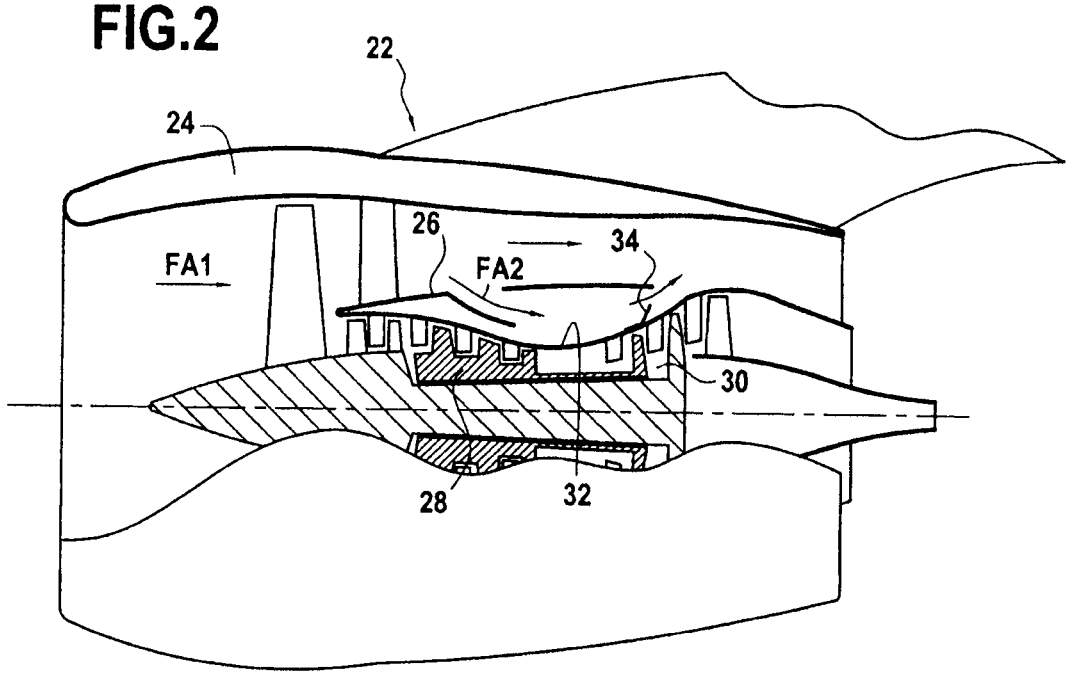
FIG. 2 is a longitudinal section view of an aircraft turbojet to which the cooling device may be applied.

FIG. 2 shows, in simplified manner, an aircraft turbine engine of standard shape. The figure shows its outer shroud 24 and the outer wall 26 of the compression unit constituted by the low-pressure compressor 28 and the high-pressure compressor 30. A portion of the air stream FA1 penetrating between the wall 26 and the outer shroud 24 is diverted into the compressor unit. Another portion of said air stream FA1, given the reference FA2, is diverted so as to come into contact with the skin 32 of the compressor unit. Said stream FA2 serves in particular to cool said wall 32. FIG. 2 is a schematic view showing the positioning of a cooling part 34 that is described in more detail below. At present, it suffices to point out that said cooling part 34 remains in a rest position while the wall 32 is at a temperature that is lower than or equal to the transition temperature T of the shape-memory alloy used for making the cooling part and that the part takes up its active position when the wall 32 reaches said temperature.

Figure 3:
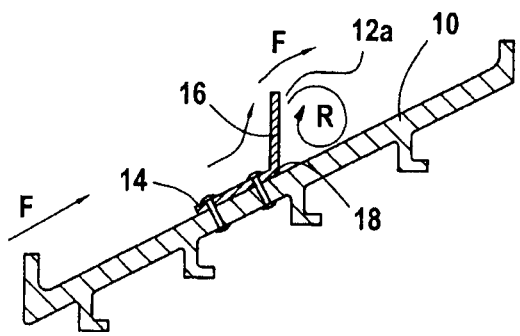
FIG. 3 is a vertical section view of a wall equipped with a cooling device in a first embodiment.
Figure 4:
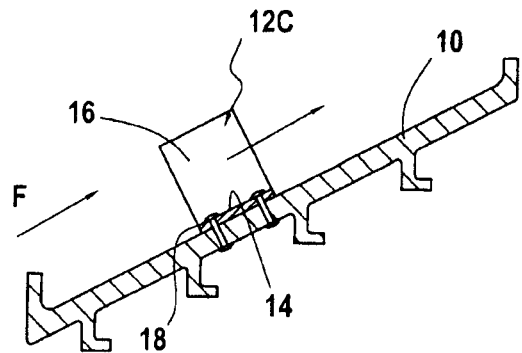
FIG. 4 is a vertical section view of a second embodiment of the cooling device.
Figure 5:
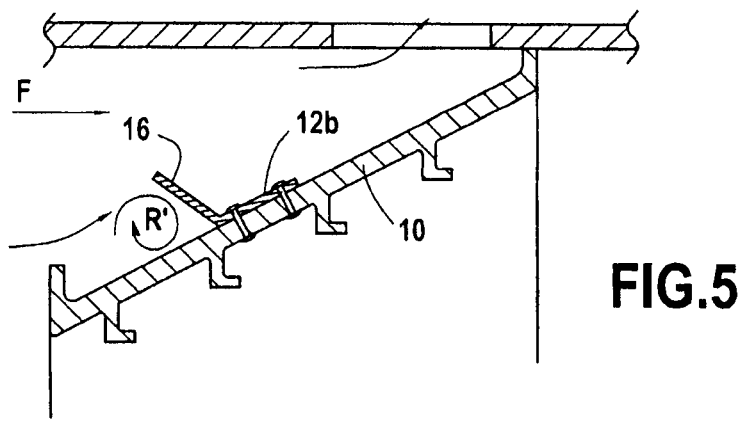
FIG. 5 is a vertical section view of a third embodiment of the cooling device.

FIGS. 3, 4 and 5 show various possible ways of mounting the cooling part 12.

In the embodiment of FIG. 3, the cooling part 12a is fastened on the wall 10 in such a manner that, when its cooling portion 16 is in the active position, said portion is not parallel to the stream of fluid F. More precisely, and preferably, the fold zone 18 of the cooling part is orthogonal to the direction of the stream of fluid F. In this configuration, the cooling part 12a is initially mounted in such a manner that the portion 16 in the raised position forms an angle of less than 90 with the wall, preferably lying in the range 45° to 75° and an angle of more than 90° with the direction F of the stream of cooling fluid.

For FIG. 5, the mounting is reversed and the cooling portion 16 of the cooling part 12b forms an angle of less than 90° with the stream of cooling fluid.

For FIG. 3 as for FIG. 5, when the cooling portions 16 of the cooling parts 12a and 12b are in their active positions, said cooling portions create eddies R or R' upstream or downstream from the cooling part. These disturbances in the flow of cooling fluid close to the wall 10 modify the Reynolds coefficient in this zone and in well-known manner, that enables the cooling of the wall 10 to be improved.

In the implementation shown in FIG. 4, the fold zone 18 of the cooling part 12c is parallel to the flow direction of the cooling fluid stream F and preferably the cooling portion 16 of the cooling part 12c when in the active position is orthogonal to the wall 10. When the cooling portion 16 is in the active position i.e. moved away from the wall 10, the cooling portion 16 constitutes the equivalent of a cooling fin that is thermally connected to the wall 10. Said cooling fin therefore enables the heat-exchange area to be increased between the cooling fluid and the wall 10, thus improving the cooling of said wall. More precisely, considering the fraction of the area of the wall 10 that is covered by the cooling portion 16 when the wall is at rest, said same area is multiplied by three when the portion 16 arrives in its active position, since both of its faces participate in heat exchange.

Figure 6A:
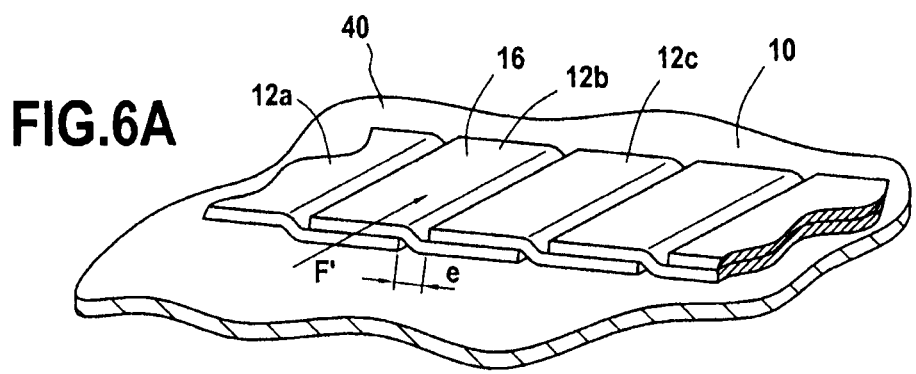
FIG. 6A is a view of a cooling device of the invention comprising a plurality of cooling parts in the rest position.

It goes without saying that a single cooling part is usually not sufficient for producing the sought-after cooling effect and in addition, the walls to be cooled are often cylindrical walls and it is therefore desirable for the cooling system to also be circularly symmetrical. For FIGS. 6A and 6B, the cooling device 40 is constituted by a plurality of cooling parts 12a, 12b, 12c, etc. The fastener portions 14 for fastening said cooling parts are naturally fastened directly on the wall 10 to be cooled while leaving a gap e between the successive fastener portions. As shown in the figures, the cooling portions 16 cover much of the fastener portions 14 of the adjacent cooling parts. More precisely, at rest, the fold zone 18 of each cooling part is bent in such a manner that fastener portions 14 and the cooling portions 16 are parallel to each another but offset by a distance that is substantially equal to the thickness of the fastener portions. Considerable linear density of the cooling parts is thus obtained. In this embodiment, the fold zones 18 of the cooling parts 12a, 12b, etc. are parallel to the direction F of the stream of cooling fluid. It goes without saying that for the initial forming of cooling parts, said parts are shaped in such a manner that at rest, i.e. below their transition temperature T, they present the shape shown in FIG. 6A. As described above and as shown more clearly in the active position of FIG. 6B, the cooling portions 16 of the cooling parts 12a, 12b, 12c, etc. are orthogonal to the wall 10 and parallel to one another. The various cooling portions 16 define parallel channels 42 for cooling fluid to flow through.

Figure 6B:
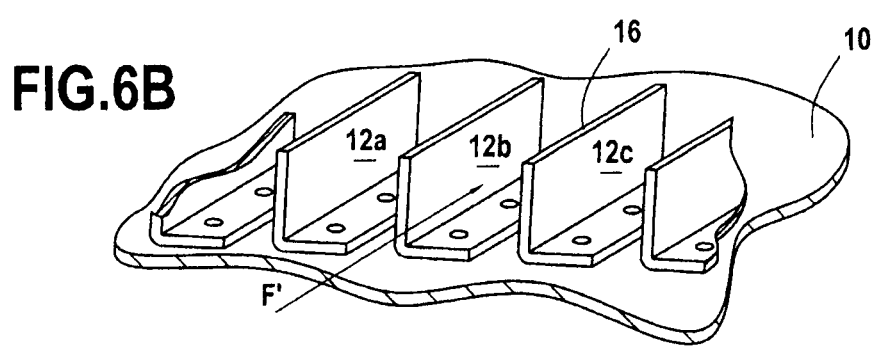
FIG. 6B is similar to FIG. 6A but the cooling parts are in the active position.

As explained above, with this arrangement, the heat-exchange area between the wall 10 and the stream of cooling fluid is multiplied by three when the cooling portions 16 are in the active position as shown in FIG. 6B.

Figure 7:
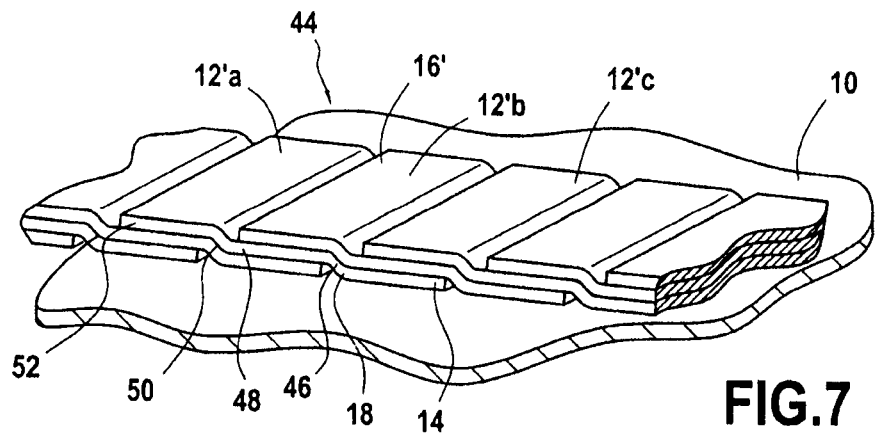
FIG. 7 is a perspective view of a variant embodiment of the cooling device shown in FIGS. 6A and 6B.

FIG. 7 shows another variant embodiment of the cooling device having the general reference 44. Generally, this system is constituted by "three layers" of cooling part elements. Each part 12'a, 12'b, etc. includes a fastener portion 14 that is identical to the fastener portions described above and a cooling portion 16'. Said cooling portion 16' is connected to the fastener portion 14 by a fold zone 18. The cooling portion 16' includes a first step 46, a first cooling fraction 48, a second step 50 and a second cooling fraction 52. Said two steps 46 and 50 enable the cooling portion 16' to overlie firstly the fastener portion of a cooling part offset by two rows and secondly the first cooling fraction of the cooling portion of the cooling part offset by one row.

Each cooling part 12'a, 12'b, etc. is initially trained so that the cooling portion 16' forms a right angle with the fastener portion 14 by pivoting around the fold zone 18. Depending on the embodiment, provision may be made for the second step 50 in its final state to disappear in such a manner that the cooling portion 16' is plane, or provision may equally well be made for the step to remain.

It can be understood that this embodiment obtains a higher density of cooling parts per unit area of the wall 10 to be cooled. More precisely, if S is the area of the fastener portion 14, it can be understood that the heat-exchange area has a value of four times S.

Figure 8:
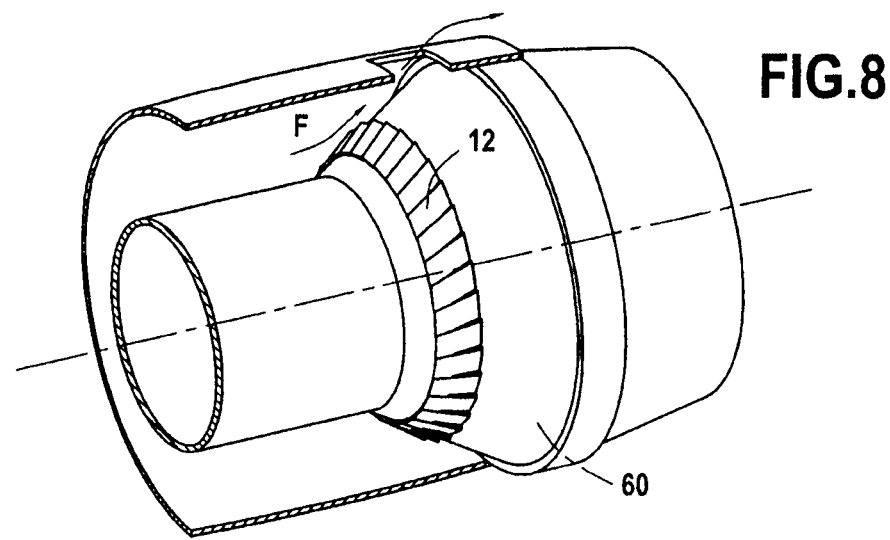
FIG. 8 is a perspective view of a cylindrical wall equipped with a cooling device of the invention.
Figure 10:
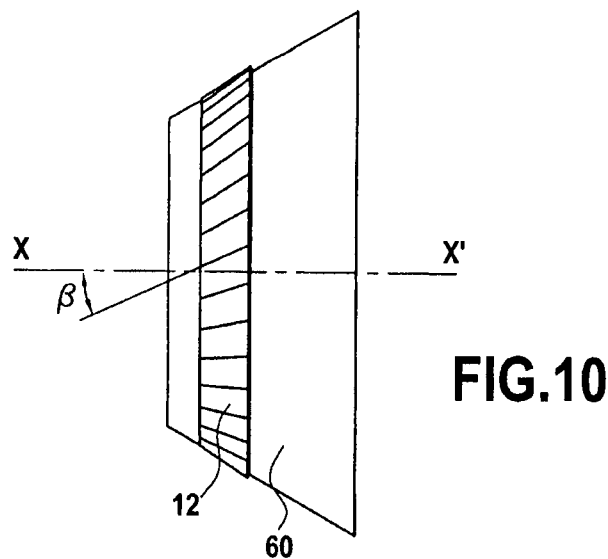
FIG. 10 shows a variant embodiment of the cooling device shown in FIG. 8.

FIGS. 8 and 10 show cooling parts 12 fastened to a wall 60 that is a shell that is cylindrical or more precisely frustoconical. For FIG. 8, in the active position, the cooling portions are parallel to the stream F of the cooling fluid. For FIG. 10, said same cooling parts 12 have fold zones forming an angle β with the axis X-X' of the frustoconical surface 60 to be cooled.

In the embodiments shown in FIGS. 8 and 10, the fold zones 18 of the cooling parts are parallel to one another and therefore operate in the same way as cooling fins. However, it goes without saying that the cooling parts could be fastened in such a manner that their fold zones are all placed on a single circumference of the wall to be cooled. There may also be a plurality of cooling part "rings" that are offset along the axis of revolution of the wall.

Figure 9:
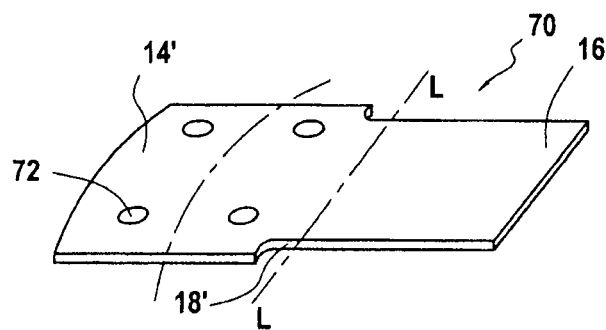
FIG. 9 is a perspective view of an embodiment of a cooling part used in the example shown in FIG. 8.

FIG. 9 shows an example of cooling parts 70 that are more particularly adapted to being fastened on a cylindrical or frustoconical surface. The fastener portion 14' has the shape of a fraction of cylindrical surface and may be fastened onto the cylindrical surface by rivets 72 or also by bolts or by welding. The cooling portion 16 is identical to those shown in the above-described figures, the fold zone 18' is shaped in such a manner that the fold line L-L' is in fact rectilinear, said fold zone 18' providing a transition between the cooling portion 16 that is plane and the surface 14' in the shape of a portion of a cylindrical surface.

Figure 11:
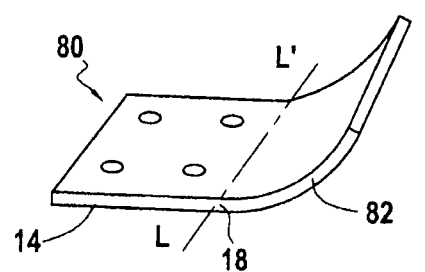
FIG. 11 is a perspective view of another variant embodiment of the cooling part in the active position.

FIG. 11 shows yet another variant embodiment 80 of cooling parts. In this embodiment, the fastener portion 14 is identical to the above-described fastener portions and the entire part has been trained in such a manner that in the active position, the cooling portion 82 is in the shape of a portion of cylindrical surface with generator lines that are parallel to the fold line L-L' defined by the fold zone 18.

The invention claimed is:

1. A wall-cooling device for cooling a wall having a first face subjected to a heat source and a second face along which an outer fluid flows at a temperature that is lower than a temperature T in order to maintain said wall at a temperature that is substantially equal to the temperature T, the wall-cooling device also comprising at least one cooling part including a fastener portion and a cooling portion, said part being made of a thermally-conductive shape-memory alloy having a transition temperature equal to said temperature T, said fastener portion including fastener means for fastening the fastener portion rigidly on the second face of said wall, said cooling portion being shaped so as to take up a first position that is substantially parallel to said wall when the temperature of the wall is lower than said temperature T and, if the temperature of the wall is at least equal to the temperature T, so as to take up a second position in which a mean plane of said cooling portion defines, relative to a plane tangential to said wall, a dihedral angle lying in the range 45° to 90°.

2. A cooling device according to claim 1, wherein the mean plane of said cooling portion in the second position is substantially parallel to the flow direction of the outer fluid.

3. A cooling device according to claim 2, wherein in the second position, said cooling portion forms an angle that is substantially equal to 90° relative to the plane tangential to said wall.

4. A cooling device according to claim 1, wherein the mean plane of said cooling portion in the second position is substantially orthogonal to the flow direction of the outer fluid.

5. A cooling device according to claim 4, wherein said cooling portion, in the second position, forms an angle lying in the range 45° to 75° with a half-plane at a tangent downstream from said part along the flow direction of said outer fluid.

6. A cooling device for a substantially plane wall, according to claim 2 or claim 3, comprising a plurality of cooling parts substantially in alignment along at least one straight line parallel to the flow direction of the outer fluid.

7. A cooling device for a wall that is substantially a surface of revolution, according to claim 4 or claim 5, comprising a plurality of cooling parts placed substantially along at least one circle of said surface of revolution.

8. A cooling device for a substantially plane wall, according to claim 2 or claim 3, comprising a plurality of cooling parts placed along at least one straight line substantially orthogonal to the flow direction of the outer fluid.

9. A cooling device for a wall that is substantially a surface of revolution, according to claim 2 or claim 3, comprising a plurality of cooling parts placed on planes containing the axis of revolution of said wall.

10. A cooling device, according to claim 4 or claim 5, comprising a plurality of cooling parts placed on at least a single line.

11. A cooling device according to claim 6, wherein said cooling parts have different transition temperatures T.

12. A cooling device according to claim 7, wherein the fastener portion of each cooling part has the shape of a fraction of cylindrical surface and in that the cooling portion is substantially plane.

13. An aircraft turbine engine, wherein an outside face of a wall of a compressor assembly is equipped with a cooling device according to claim 1.

14. A cooling device according to claim 9, wherein the fastener portion of each cooling part has the shape of a fraction of cylindrical surface and in that the cooling portion is substantially plane.

* * * * *